Patented July 9, 1929.

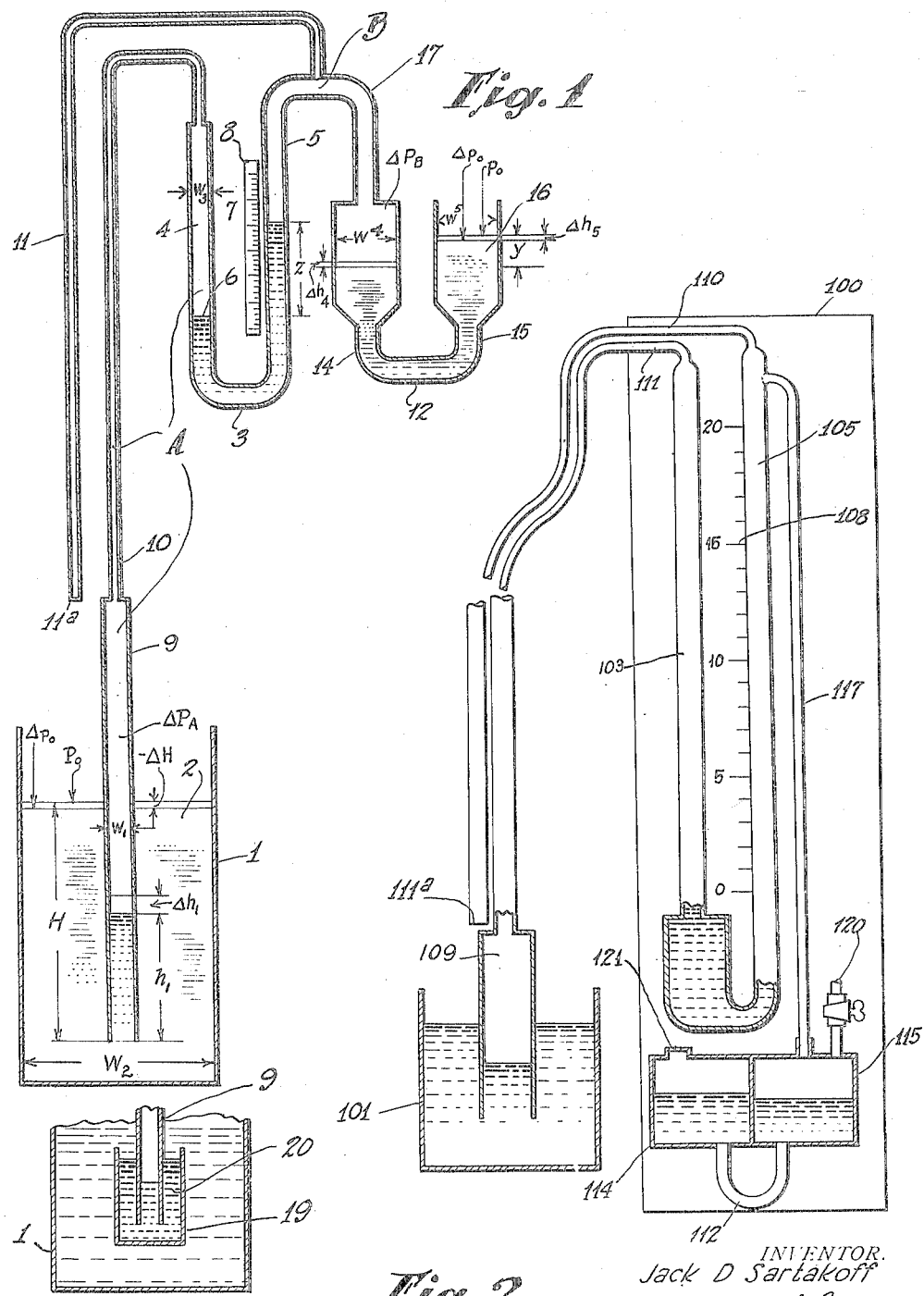

1,720,528

UNITED STATES PATENT OFFICE.

JACK D. SARTAKOFF, OF NEW YORK, N. Y., ASSIGNOR OF ONE-HALF TO J. D. SARTAKOFF CORPORATION, OF NEW YORK, N. Y., A CORPORATION OF NEW YORK, AND ONE-HALF TO KHETAH CORPORATION, OF NEW YORK, N. Y., A CORPORATION OF NEW YORK.

GAUGE FOR AND METHOD OF MEASURING LIQUIDS.

Application filed September 16, 1925. Serial No. 56,561.

This invention is a gauge for and method of measuring liquids and relates, generally, to gauges of that character wherein the measurement of a liquid is determined by the hydrostatic pressure of such liquid; that is to say, a gauge wherein a reading column is caused to move in juxtaposition with a reading scale by the varying pressures imposed on an enclosed body of air or gas by changes in hydrostatic pressure due to change in level of the liquid.

In gauges of this character, it is the practice to house a liquid reading column within a U-tube, one leg of which is associated with a reading scale, and the other leg of which is connected by a conduit to a cylinder extending vertically into the liquid to be measured. The cylinder and conduit contain air or gas which is compressed to a greater or lesser extent, depending upon the depth of the liquid, and such pressure is communicated to the reading column to cause it to presumably show the amount of liquid being measured.

Gauges of this character have not proven satisfactory for many reasons, chiefly for the fact that the contained air or gas is so affected by changes in thermometric and barometric pressures, that it is practically impossible to obtain correct readings.

With the foregoing considerations in mind, the objects of the present invention are to provide a gauge of the general character under consideration with a compensating device which will offset the disturbing influences of changes in temperature and outward barometric pressure and will allow a gauge of the kind referred to above to be used for accurately measuring liquids and to accomplish this result by relatively simple and inexpensive apparatus.

In carrying out the invention in its preferred practical form, I employ a U-tube, or its equivalent, containing a liquid reading column and associated reading scale, as heretofore, and connect one leg of the U-tube by a conduit to a hydrostatic pressure cylinder as in prior practice. This U-tube will be hereinafter referred to as the "measuring U-tube". In this arrangement, a body of enclosed air or gas will be interposed between the liquid in the pressure cylinder and the reading column. This body of air may be termed the "acting body".

To adapt the present invention to this apparatus, one leg of a second U-tube, or its equivalent hereinafter termed the "compensating U-tube", is placed in communication with the other leg of the measuring U-tube. The other leg of the compensating U-tube is vented to the atmosphere.

The compensating U-tube is partially filled with a suitable liquid, e. g., metallic mercury, and this results in enclosing a body of air or gas between the reading column and the mercury. This body of air may be termed the "compensating body".

With this arrangement it will be apparent, that the reading column is simultaneously under the effect of the air pressure of the acting body and the air pressure of the compensating body. So if a variation of air pressure of the acting body takes place because of change of temperature or of atmospheric pressure, a simultaneous change of pressure, due to the same circumstances, will take place in the compensating body. If the dimensions of the different parts of the device are properly proportioned this change of pressure of the compensating body will offset the change of pressure of the acting body and thereby preclude incorrect fluctuations of the reading column.

In other words, the present invention provides means for stabilizing the reading column by compensating for disturbances in temperature and barometric pressure, while providing for proper shifting of the reading column under the hydrostatic pressure of the liquid to be measured. The parts are, of course, properly organized and shaped to give this result and practice has demonstrated that the measurement of the liquid is accomplished with great accuracy. That the principles underlying the present invention are fundamentally sound can be mathematically proven and the invention is based on accepted laws of physics governing volumes and pressure.

Features of the invention, other than those adverted to, will be apparent from the hereinafter detailed description and claims, when read in conjunction with the accompanying drawings.

In the accompanying drawings, I have illustrated more or less diagrammatically, apparatus for carrying out the present invention, but it will be understood that this showing is for the purpose of illustration, only, and does not define the limits of the invention.

Figure 1 is a diagrammatic showing of the present invention.

Figure 2 illustrates apparatus, more or less diagrammatically, showing one form of which the invention may partake; and Figure 3 is a fragmentary section illustrating the modified form of construction.

Referring to the drawings and more particularly to Figure 1, 1 designates a receptacle or tank containing a body of liquid 2. 3 is a measuring tube of U-shaped configuration, this tube being provided with two legs 4 and 5 in which is collectively contained a liquid 6, one leg of which 7 constitutes a reading column and cooperates with a graduated scale 8.

Extending downwardly into the body of liquid 2 is a pressure cylinder 9, which is opened at its bottom and closed at its top save for a connection with a conduit 10, which leads from the upper end of the cylinder 9 to the upper end of the leg 4 of the measuring U-tube. This conduit 10 has a tight connection with the U-tube, so as to form a substantially sealed passage between the U-tube and cylinder 9.

The body of liquid 2 contained in the tank 1 is adapted to seal the lower end of the cylinder 9 and a portion of said liquid rises within the cylinder and compresses the air therein and in the conduit 10, this pressure being obviously controlled by the hydrostatic pressure of the liquid head 2. The pressure under which the air in the conduit 10 is thus placed acts upon that portion of the reading column which is in the leg 4 of the measuring U-tube and causes the measuring column 7 to rise. A reading of the position of the column 7 with respect to the scale 8 may be readily had, and the graduations of such scale are such as to show the quantity of liquid contained in the receptacle 1 under constant conditions of temperature and barometric pressure.

In order to compensate for difference in temperature and pressure, I associate with the apparatus thus far described a compensating U-tube 12. The compensating U-tube 12 has two legs 14 and 15, which are preferably somewhat larger than the base of the U-tube, so as to permit them to contain an appreciable body of liquid 16 of which mercury may be referred to as illustrative. The upper end of the leg 15 is open to the atmosphere or vented, while the upper end of the leg 14 is closed except for its connection through a conduit 17 with the upper end of the leg 5 of the measuring U-tube.

Air is preferably present in the cylinder 9, conduit 10, and leg 4 and the placing of this air under the hydrostatic pressure of the body of liquid 2 to effect the shifting of the reading column. Gas may, however, be used in lieu of air, although air is entirely satisfactory in practice. Similarly gas or air is contained within the conduit 11. In other words, there is a body of air housed between the top of the liquid rising in the cylinder 9 and the top of the reading column in the leg 4 of the measuring U-tube. This body of air may be referred to as the acting body. Similarly there is a body of air contained in the conduit 17 and in the legs 5 and 14 of the respective U-tubes above the liquids in said tubes, this latter body of air may be referred to as the balancing or compensating body.

Under ordinary conditions the mercury in the two legs of the compensating U-tube will seek a common level and the pressures of the acting and compensating bodies of air will be balanced. However, if a variation of pressure of the acting air occurs, due to changes in temperature or barometric pressure, the tendency of the reading column to shift will be offset by the compensating body of air which will bring about such shifting of the mercury column as is necessary to effect compensation.

This compensating effect is due to the fact that the change of barometric pressure or atmosphere temperature simultaneously affects both the acting body of air and the compensating body of air. The parts of the apparatus can readily be properly proportioned so that changes in pressure, due to temperature or barometric fluctuations, will be substantially equal in both bodies. Consequently, the reading column will not be disturbed by variations in these factors of temperature and pressure and will be in the state of equilibrium, so far as they are concerned. Accordingly, said reading column will vary only as the hydrostatic pressure of the liquid body varies. As a result true readings or measurement of the liquid contained in the receptacle 1 are accomplished.

In order to establish the mathematical expression of the principles involved in this invention and to determine the proportions between the different constituent parts of the device, required to effectuate the purpose sought, let us suppose that with the depth H of the liquid (2) in vessel (1), the hydrostatic columns in a state of equilibrium in the different parts of the device will be respectively $h_1$, $z$ and $y$. Let us further designate by $\gamma_1$ the density of the liquid (2) : by $\gamma_3$ the density of the liquid in the measuring tube 3 and by $\gamma_4$ the density of the liquid in the compensating tube 12. Further let $w_2$ and $w_1$ be the cross sections of vessel 1 and of the pressure cylinder (9) ; $w_3$ the cross section of the measuring tube (3), and $w_4$ and $w_5$ the cross section of the respective legs of the compensating tube. In practice $w_3$ is usually very small, so the change in volume in A and B, caused by the movement of the measuring column is insignificant in comparison with the change produced by the variation of the column $h_1$ and respectively $h_4$; in other words the influence of $z$ on the volume A and B can be neglected.

With $P_0$ being the pressure of the outside atmosphere, which acts upon the surface of the bodies of liquid in (1) and (16), the equilibrium between the different pressures and hydrostatic heads will be as follows:

$$(H-h_1)\gamma_1 = P_A - P_0$$
$$z\gamma_3 = P_A - P_B$$
$$y\gamma_4 = P_B - P_0$$

where $P_A$ and $P_B$ are the pressures of air respectively in the spaces A and B.

Suppose now that the outside atmospheric pressure changes by $\Delta P_0$. The effect of this change will be a rise of the liquid in cylinder (9) by $\Delta h_1$, accompanied by a decrease of H by $-\Delta H$ and an increase of pressure in A by $\Delta P_A$. Correspondingly there will be changes of level in the compensating tubes of $\Delta h_4$ and $\Delta h_5$, and an increase of pressure in space B of $\Delta P_B$. The changes of level and the changes of pressure are related as follows:

$$(a) \begin{cases} \Delta P_0 - \Delta P_A = \gamma_1 \Delta h_1 - \gamma_1 \Delta H = \gamma_1 \Delta h_1 \left(1 - \dfrac{\Delta H}{\Delta h_1}\right) \\ \Delta P_0 - \Delta P_B = \gamma_4 (\Delta h_4 + \Delta h_5) = \gamma_4 \Delta h_4 \left(1 + \dfrac{\Delta h_5}{\Delta h_4}\right) = \gamma_4 \Delta h_4 \left(1 + \dfrac{w_4}{w_5}\right) \end{cases}$$

With reference to the first equation, obviously $$\frac{\Delta H}{\Delta h_1} = \frac{w}{w_2}$$

As the size of the pressure tube is always small compared to the cross section of the vessel (1), the lowering of the level of liquid (2) conditioned by the change $-\Delta H$ is very small. So the second member in the parentheses can be neglected and the first of the equations $(a)$ written in simple form:

$$\Delta P_0 - \Delta P_A = \gamma_1 \Delta h_1 \quad (a')$$

The condition for compensation is, that the change of atmospheric pressure should not affect the reading of the measuring tube. In other words a change $\Delta P_0$ should leave $z$ unaffected. Such will be the case if the device is so proportioned, that a change of $\Delta P_0$ will result in $\Delta P_A$ being equal to $\Delta P_B$. The condition $\Delta P_A = \Delta P_B$ in the light of Equations $(a)$ and $(a')$ leads to $$\gamma_1 \Delta h_1 = \gamma_4 \Delta h_4 \left(1 + \frac{w_4}{w_5}\right)$$

or $$\frac{\Delta h_1}{\Delta h_4} = \frac{\gamma_4}{\gamma_1}\left(1 + \frac{w_4}{w_5}\right) \quad (b)$$

Another equation is obtained from the elementary law of compression of gases, the change of pressure being proportionate to the relative changes of volume. In fact, there will be an equal change of pressure in the spaces A and B in the event that the relative change of volume produced by the movements of the liquid columns in the pressure and in the compensation tube will be equal. That is, if $$\frac{w_1 \Delta h_1}{V_A} = \frac{w_4 \Delta h_4}{V_B}$$

or $$\frac{w_4}{w_1} = \frac{V_B}{V_A} \cdot \frac{\Delta h_1}{\Delta h_4} \quad (c)$$

In these equations $V_A$ and $V_B$ are the respective volumes of the acting and compensating body of air or the cubic contents of space A and B.

Substituting $$\frac{\Delta h_1}{\Delta h_4}$$

from Equation $(b)$ into Equation $(c)$ we obtain $$\frac{w_4}{w_1} = \frac{V_B}{V_A} \cdot \frac{\gamma_4}{\gamma_1}\left(1 + \frac{w_4}{w_5}\right) \quad (I)$$

which is the sought for relation between the section of the compensating tube and that of the pressure tube.

Let us now show that Equation (I) holds also in case of temperature changes, that is, that the proportions necessary to compensate against variations of temperature are similar to those required to compensate against variations of pressure. In fact, suppose that the temperature surrounding the device were to rise by $\Delta t$; assume that this rise of temperature would increase the respective pressures of A and B by $\Delta P_A$ and $\Delta P_B$. As a result, there would be a change of level in the pressure and compensating tube as follows:

$$-\gamma_1 \Delta h_1 = \Delta P_A$$
$$-\gamma_4(\Delta h_4 + \Delta h_5) = \Delta P_B$$

Again the condition for compensation, requiring that $\Delta P_A$ should be equal to $\Delta P_B$ gives:

$$\gamma_1 \Delta h_1 = \gamma_4(\Delta h_4 + \Delta h_5) = \gamma_4 \Delta h_4\left(1 + \frac{\Delta h_5}{\Delta h_4}\right) = \gamma_4 \Delta h_4\left(1 + \frac{w_4}{w_5}\right) \quad (d)$$

On the other hand, with a change of temperature, an equal change of pressure in A and B demands that the relative changes of volume be equal, that is, that $$\frac{w_1 \Delta h_1}{V_A} = \frac{w_2 \Delta h_4}{V_B} \quad (e)$$

Equations (e) and (d) are identical with Equations (c) and (b) and will obviously lead to Equation (I).

Equation (I) thus determines certain proportions to be given to the tubes 9 and 14, which proportions depend on the nature of the liquids, the volumes of the spaces A and B and the relative size of the legs of the compensating device. A device designed so as to satisfy Equation I, shall measure the depth H by a reading of Z with the disturbing influence of variations in atmospheric pressure and temperature eliminated.

Although it is found that the present invention as thus far described may be used as complete, there are instances where an adjunct may be added to overcome the effect of very extreme conditions. For example, if the apparatus of the invention were so installed that the conduit 10 would be subjected to great differences in temperature, while the conduit 17 was not subjected to such differences, it might be desirable to associate with the apparatus a separate balancing conduit shown at 11. This conduit could conveniently be a branch of the conduit 17 and when used in practice is positioned to extend alongside of and parallel to the conduit 10 to a point where said latter conduit connects with the cylinder. The free end of the conduit 11 is closed or sealed. In practice, the conduits 10 and 11 may be conveniently housed within a suitable envelope, so as to maintain them close to one another in order that air or gas contained in said conduits will be under the same influences of change in temperature irrespective of the extent of these influences.

The advantage of this construction is that marked temperature changes in the vicinity of the conduit 10 will be accompanied by like changes with regard to the conduit 11 and the resulting pronounced variations in pressure within the conduit 11 will be transmitted to the conduit 17 and will assist in the compensation.

There are installations possible wherein changes of pressure in the conduit 10 (i. e. in the actuating body of air) would cause the actuating body of air to escape through the liquid at the lower end of the cylinder 9. To obviate this occurrence, I may associate with the lower end of this cylinder a suitable seal, preferably a mercury seal, after the manner shown in Figure 3. In this figure the lower end of the cylinder 9 is shown as projecting into a receptacle 19 containing mercury 20. The mercury will form an efficient seal against blowing out of the pressure, but the hydrostatic pressure of the body of liquid 2 will act through the mercury seal upon the actuating body of air in the same manner as hereinbefore described.

In Figure 2 apparatus embodying this invention, without the mercury seal, is illustrated in a more or less diagrammatic way. In this showing 100 designates a suitable holder on which the measuring U-tube 103 and the compensating U-tube 112 are supported. The legs 114 and 115 of the compensating U-tube are in the form of receptacles, the latter of which is connected by the conduit 117 to the leg 105 of the measuring U-tube. Mercury or other compensating liquid is introduced into the compensating U-tube through an inlet 120 and the leg 114 is shown as vented at 121.

The scale 108 is formed directly upon the holder 1 in juxtaposition with the leg 105 of the measuring U-tube and from the upper ends of both of the legs of such tube extend conduits 110 and 111. The conduit 110 corresponds to the conduit 10 and is connected to the pressure cylinder 109, the lower end of which is immersed in liquid in the tank 101. The conduit 111 corresponds to the conduit 11 and its blind end 111ª is closed in like manner. The structure of Figure 2 operates in the identical manner previously described in explaining the method of this invention.

It will be apparent from the foregoing detailed description that the gauge of the present invention is simple and efficient in its operation and that the underlying method of this invention will produce extremely accurate results. The invention may be employed to measure various liquids and may constitute a stationary gauge or a gauge to be used on vehicles, boats and in other environment where accurate readings are desired. I particularly refer to the use of U-tubes to hold the reading column and the compensating liquid. The compensating liquid functions as will be apparent, after the manner of a liquid piston, and, in effect, the reading column acts in a like manner. The term U-tube is used to describe the general arrangement of the parts, but it will be understood that the exact shaping is immaterial, as evidenced by the shape of the compensating U-tube in Figure 2, wherein said tube is shown as comprising a pair of chambers connected by a passage. In any event, the compensating liquid functions as a piston, so that when acted upon on one of its ends by atmospheric pressure, it will react against the body of gaseous fluid between it and the measuring column to produce the compensating effect to which I have referred. It therefore follows that the body of mercury will serve to act upon said body of air in a manner to offset or compensate for those fluctuations of the pressure of the gaseous fluid acting against the other end of the reading column and due to disturbing factors other than normal change in hydrostatic pressure of the liquid to be measured.

Moreover, inasmuch as both bodies of air which act against the opposite end of the reading column are subjected to the same temperature changes and are also subjected to the same atmospheric changes, it necessarily follows that the reading column will be maintained in equilibrium irrespective of said changes and will only be moved as the quantity of liquid to be measured is changed in volume to thereby effect changes in hydrostatic pressure of such liquid while the volume of liquid in the compensating piston remains the same. Through this variation in hydrostatic pressures, the reading column is moved, but it is not moved by fluctuations in pressure of the bodies of air under changes in temperature or barometric pressure.

Having thus fully described the invention, what I claim as new and desire to secure by Letters Patent is:

1. In a gauge, an air pressure cylinder adapted to extend into the body of liquid to be measured, a measuring U tube containing a liquid reading column, and a conduit connecting the air pressure cylinder to one leg of the measuring U tube and containing air, in combination with a compensating U tube containing a liquid and a conduit containing air and connecting the other leg of the measuring U tube with one leg of the compensating U tube, and a balancing conduit connected to the last mentioned leg of the measuring U tube and extending along and in proximity with the first mentioned conduit to substantially the point of connection of said first mentioned conduit to the pressure cylinder and provided with a closed end.

2. A gauge embodying an air pressure cylinder adapted to extend into a body of liquid to be measured, a measuring U tube containing a liquid reading column, a conduit connecting one leg of such U tube with the air pressure cylinder, said conduit and the spaces above the liquid in said leg of the measuring U tube and the air pressure cylinder constituting a common body of air sealed against the outside atmosphere, in combination with a compensating device embodying two vessels containing a common body of liquid and connected together below the liquid level in said vessels and an air chamber sealed against the outer atmosphere and interposed between and connected with the other leg of the measuring U tube and one of said vessels, the size of the vessels of such compensating device, the volume of the air in the interposed chamber, and the specific gravity of the liquid in said vessels being so proportioned as to offset the disturbing influence on the reading column of changes of temperature and outer atmospheric pressure.

3. The method of measuring liquids by movement of a reading column contained in a U tube which consists in placing the reading column in a state of equilibrium between two bodies of air acting against the opposite ends of the column with one of said bodies under hydrostatic pressure of the liquid to be measured and the other of said bodies under hydrostatic pressure of a liquid column proportioned to compensate for and offset disturbing influences on the reading column due to changes in temperature and barometric pressure.

4. The method of measuring liquids by movement of a reading column contained in a U tube which consists in utilizing the hydrostatic pressure of the liquid to be measured to compress a body of air, applying the pressure of such air to one end of the reading column, and compensating for fluctuations in the pressure of such air due to disturbing factors of changes in temperature and barometric pressure, by imposing upon the other end of the reading column another body of air under compensating hydrostatic pressure and subjected to the same disturbing factors.

In testimony whereof I have signed the foregoing specification.

JACK D. SARTAKOFF.